United States Patent [19]

Hoffmann et al.

[11] Patent Number: 5,281,123

[45] Date of Patent: Jan. 25, 1994

[54] DEVICE FOR ATTACHING A PROTECTIVE COVER TO THE END OF AN ELECTRIC WIRE

[75] Inventors: Ernst Hoffmann, Langenhagen; Dieter Zimmer, Muggensturm; Klaus Porcher, Lehrte; Harry Staschewski, Langenhagen, all of Fed. Rep. of Germany

[73] Assignee: Kabelmetal Electro GmbH, Fed. Rep. of Germany

[21] Appl. No.: 891,793

[22] Filed: Jun. 1, 1992

[30] Foreign Application Priority Data

Jun. 1, 1991 [DE] Fed. Rep. of Germany ....... 4118005

[51] Int. Cl.⁵ ................... B29C 45/06; B29C 45/14
[52] U.S. Cl. ................. 425/129.1; 29/564.1; 425/576
[58] Field of Search ............ 425/114, 574–576, 425/129.1; 29/564.4, 564.1

[56] References Cited

U.S. PATENT DOCUMENTS

| 3,224,043 | 12/1965 | Lameris et al. | 425/576 X |
|---|---|---|---|
| 3,555,609 | 1/1971 | Chu et al. | 425/576 X |
| 3,591,893 | 7/1971 | Vicini | 425/129.2 X |
| 3,730,665 | 5/1973 | Fortin et al. | 425/576 X |
| 3,835,445 | 9/1974 | Hardesty | 29/876 X |
| 3,900,278 | 8/1975 | Beck et al. | 425/129.1 X |
| 3,999,289 | 12/1976 | Buttner et al. | 29/858 |
| 4,269,588 | 5/1981 | Nogai | 425/576 X |
| 4,351,629 | 9/1982 | Farrell | 425/576 X |
| 4,411,608 | 10/1983 | Yanagisawa | 29/564.4 X |
| 4,555,227 | 11/1985 | Ditscheid | 425/576 X |
| 4,613,475 | 9/1986 | Hettinga | 425/576 X |
| 4,810,178 | 3/1989 | Proll et al. | 425/129.2 X |
| 5,211,798 | 5/1993 | Keller | 425/576 X |
| 5,226,218 | 7/1993 | Wiemeyer et al. | 425/576 X |

FOREIGN PATENT DOCUMENTS

| 3005511 | 8/1981 | Fed. Rep. of Germany | 29/564.4 |
|---|---|---|---|
| 2440264 | 2/1982 | Fed. Rep. of Germany | . |
| 3720041 | 12/1988 | Fed. Rep. of Germany | . |
| 1341788 | 9/1963 | France | 425/129.1 |
| 38-4481 | 4/1963 | Japan | 425/129.1 |
| 40-3547 | 2/1965 | Japan | 425/576 |
| 51-12663 | 4/1976 | Japan | 425/576 |
| 62-121023 | 6/1987 | Japan | 425/576 |
| 1110303 | 4/1968 | United Kingdom | 425/576 |

Primary Examiner—Richard L. Chiesa
Attorney, Agent, or Firm—Ware, Fressola, Van Der Sluys & Adolphson

[57] ABSTRACT

A device for attaching protective insulation to the end of an electric wire, having at least one lead to which a contact element has been attached, includes a carrier (1), equipped with at least three injection dies (3), which can rotate around an axis (A), and of at least one injection molding device (2, 10), located in the circumferential area of the carrier (1). A guide path, extending circumferentially around the carrier (1), is attached to a fixed part of the device. The guide path includes two portions of different radii, extending together nearly 360°, which are concentric to the axis (A) of carrier (1), and converge at one end through a transition piece in the guide path. The other ends of the guide path are located at the loading position level (I) of the injection dies (3). The movement of the injection dies (3) is guided by the guide path. The injection dies are closed in the small radius area of the guide path, and are open in the larger radius area. The carrier (1) can rotate in steps of an angle corresponding to the distance of the injection dies (3) from each other.

14 Claims, 4 Drawing Sheets

DEVICE FOR ATTACHING A PROTECTIVE COVER TO THE END OF AN ELECTRIC WIRE

BACKGROUND OF THE INVENTION

1. Field of the Invention

The invention refers to a device for attaching a protective insulation material to the end of an electrical wire having at least one lead, with a contact element attached to the bare end of the lead. The device includes an injection molding unit, through which the protective cover is extruded around the contact element and the end of the wire. The part of an electric connector thus made may be a plug or an outlet. The contact elements on the conductor of the wire are pins or sockets. Wires, to which a plug or a socket is permanently attached at one end, are described as "premanufactured" wires. The other end of such wires generally remains free. The wires are delivered to the end user as semi-finished products, for installation in any electrical device. This requires the desired part of the electric connector to be extruded onto the wire, and the other end of the wire to be prepared for connection to the electrical device without any additional expenditure. However, such premanufactured wires can have electric connector parts attached at both ends.

2. Description of the Prior Art

German Patent Document No. DE-PS 24 40 264 describes a process for producing premanufactured wires. This process is fully automatic, up to the attachment of contact elements to the bare lead of the wire. However, while this document mentions that the protective cover can be automatically extruded, no information is provided regarding the configuration of a corresponding device. In addition, provisions are made to extrude protective covers to the wire ends with contact elements, with existing injection equipment requires the wire ends to be manually inserted one by one, or several at a time. Thus, the cost of producing a premanufactured wire using this equipment is considerable.

With the device according to German Patent Document No. DE-OS 37 20 041, premanufactured wires can be produced automatically by cyclic advance. One end of a wire equipped with contact elements is cyclically advanced to at least two injection molding devices, hereinafter simply called "extruders". Each extruder extrudes a part of the protective cover to be produced. The amount of material for each part is measured, so that each part hardens sufficiently during the cycle time, and can be further transported without damage. Although this device is able to produce a premanufactured wire in one operation, the cost is relatively high, since each part requires its own extruder. In addition, the part must be extruded with great care, to ensure that a homogeneous protective cover is produced.

SUMMARY OF THE INVENTION

An object of the invention is to provide a device whereby the protective cover can be automatically extruded as a one-piece protective cover around the end of a wire equipped with contact elements.

The invention fulfills this object by providing:
- an injection molding unit which includes a rotatable carrier, equipped with plurality injection dies, and at least one extruder located in the circumferential area of the carrier,
- each of the injection dies are spaced an equal distance from its adjacent injection die in the circumferential direction, and are attached to the carrier at an equal distance from its axis,
- a fixed part adjacent the carrier which defines a guide path extending in the circumferential direction, the guide path having two portions located at different radii, concentric with the carrier axis, extending together nearly 360°, and converging at one end through a transition piece in the guide path, while the other ends are located at the loading position of the injection dies,
- guide elements attached to the injection dies and adapted to follow the guide path,
- the injection dies closed in the smaller radius area when passing through the guide path, and open in a larger radius area, and
- the carrier being rotatable in steps at an angle corresponding to the distance of the injection dies from each other.

With this device, it is possible to automatically extrude the protective cover over a part of an electric plug connector to the end of an electric wire. Any technique can be used to attach elements to be extruded to the end of the wire, and place the wire into the device. Each step of the rotating carrier of the injection molding unit, which is equipped with at least three injection dies, can receive a wire with contact elements for the extrusion process to produce the protective cover. Since the injection dies are attached to the carrier, and therefore rotate with it in steps, there is enough time to cool the extruded material, before the protective cover is unloaded from the mold. A finished wire can be removed in each step, when the injection dies open. By then, the protective cover has hardened sufficiently so that there is no danger of damage.

The device according to the present invention is able to extrude protective covers to electric wires with only one lead, or with two or more leads. The number of contact elements depends on the number of leads. Contact elements can be either pins or sockets attached to the ends of the wires.

DETAILED DESCRIPTION OF THE PREFERRED EMBODIMENT

Figure 1:
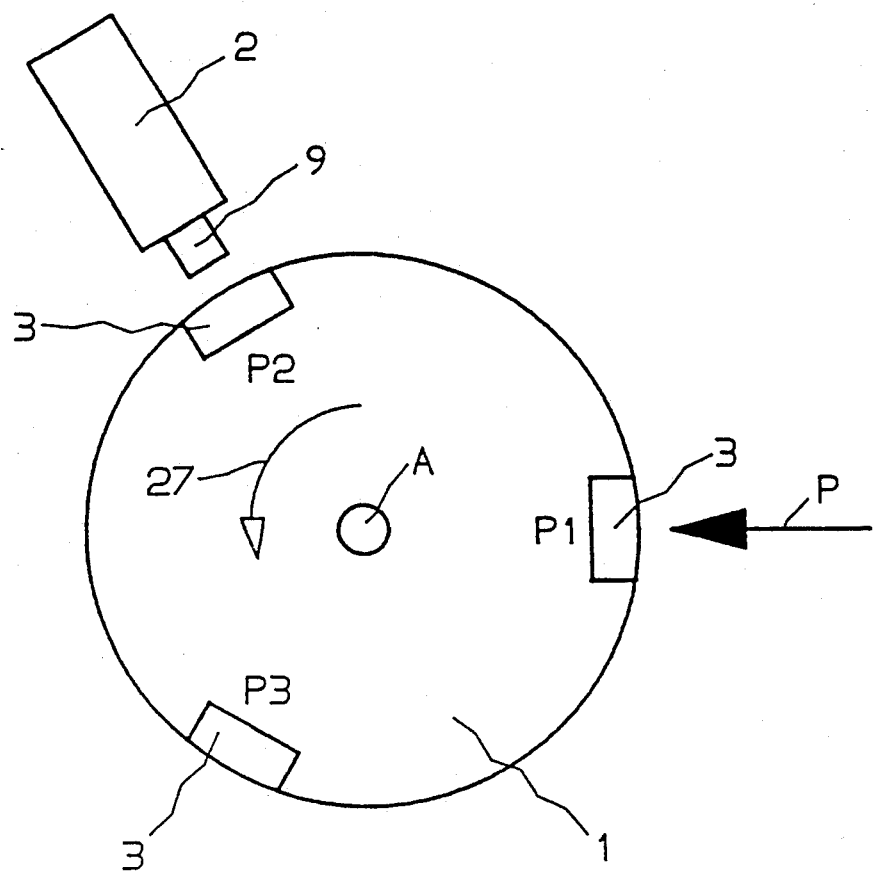
FIGS. 1 and 2 are two different schematic views of the device according to the invention.
Figure 2:
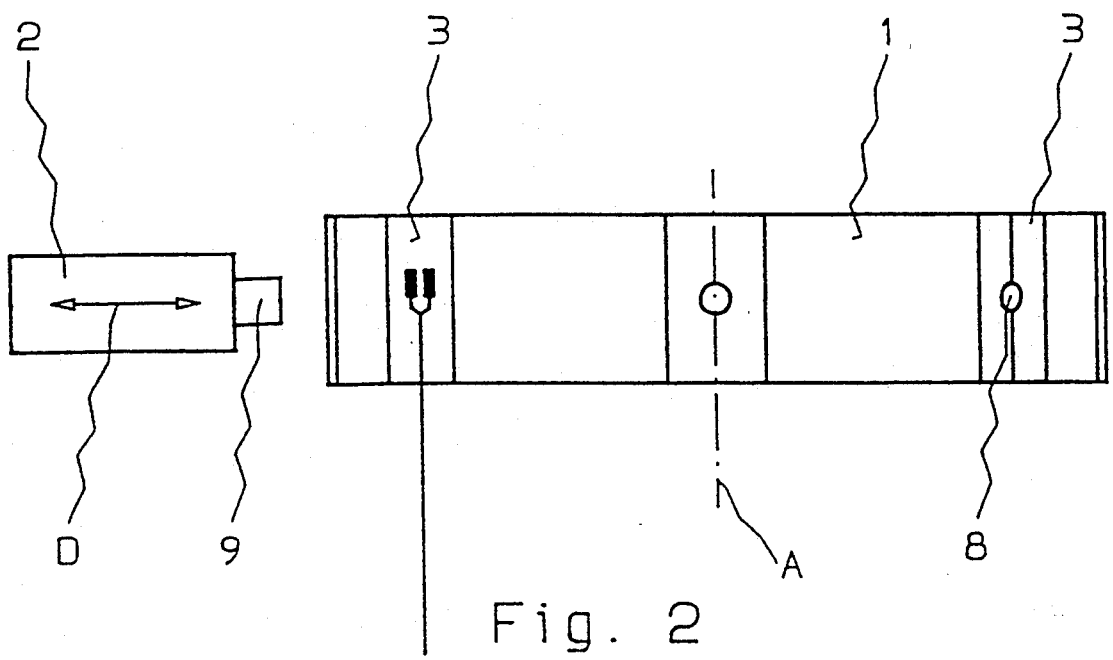
Figure 3:
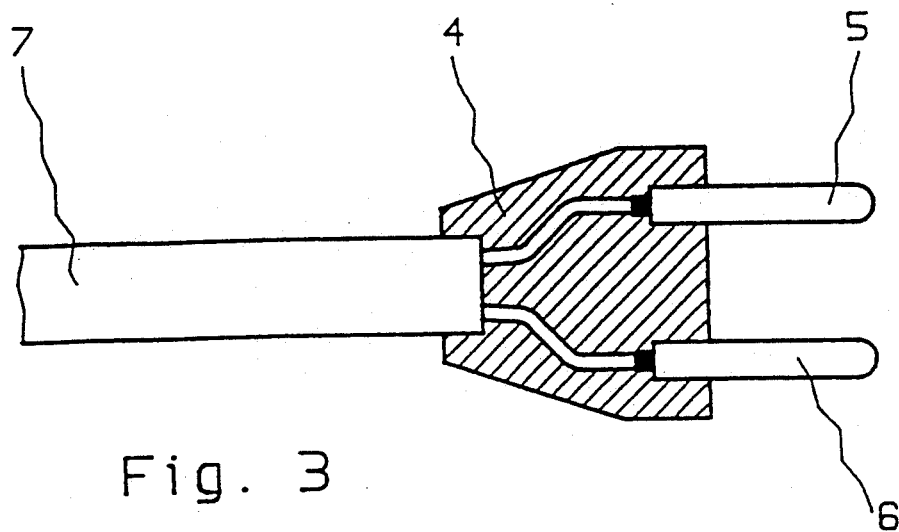
FIG. 3 is a cross-sectional view of the end of a premanufactured wire produced by the device.

The injection molding unit shown in FIG. 1 includes a carrier 1 that is able to rotate around an axis A and an injection molding device or extruder 2. Three injection dies 3, separated by 120° from each other, are located on the carrier 1 at an equal radial distance from axis $A$, for extruding the protective cover 4 shown in FIG. 3 around the end of a wire 7 equipped with plug pins 5 and 6. Each of the injection dies 3 has an inlet opening 8 (FIG. 2) located in the circumferential area of carrier 1, through which the material for the protective cover 4 can be injected into the injection dies 3 when in their closed position. To that effect, the injection head 9 of the extruder 2 is placed so that its outlet opening is located exactly at the level of the inlet openings 8 of injection dies 3. Extruder 2 can move radially in relation to carrier 1 as indicated in FIG. 2 by double arrow D.

In principle, the inlet openings 8 of injection dies 3 could alternatively be located in a lateral surface of carrier 1. Extruder 2 would then have a correspondingly different position. It would then have to be axially moveable in relation to carrier 1.

As an example, the device of the invention operates in the following manner. The end of a wire 7, equipped with plug pins 5 and 6, is placed in the direction of arrow P into an open injection die 3 in loading position P1. Wire 7 is kept as taut as possible to prevent kinking directly inside injection die 3. Carrier 1 then rotates around axis A at an angle corresponding to the distance of injection dies 3 from each other. The injection die 3 closes automatically not later than during the rotation of carrier 1. The rotation brings the injection die 3 with the inserted wire end into position P2. Another wire 7, equipped with plug pins 5 and 6, is now inserted into the injection die 3 located in loading position P1. The injection die 3 in position P2 is now filled with extrusion material by the extruder 2. To that effect, the extruder 2 advances close to the carrier 1 in mating contact with the outlet opening 8 of the injection die 3. After the injection die 3 is filled, extruder 2 returns to its starting position. In the next step of carrier 1, the filled injection die 3 with the protective cover 4 manufactured in this way, reaches position P3. The injection die 3 opens in this position, and the finished wire 7 can be removed.

Carrier 1 rotates in steps according to the distance between two injection dies 3. In the configuration with three injection dies 3 in FIG. 1, carrier 1 rotates 120° in each instance. This may be accomplished automatically, for example by an electric motor (not shown). It would preferably be an electric step motor. However, a step gear motor may also be used.

Preferably, the wires 7, equipped with the plug pins 5 and 6, are supplied automatically to the injection die 3 located in the loading position P1. A suitable transportation system may be used and adapted to the step rate at which carrier 1 rotates.

Figure 4:
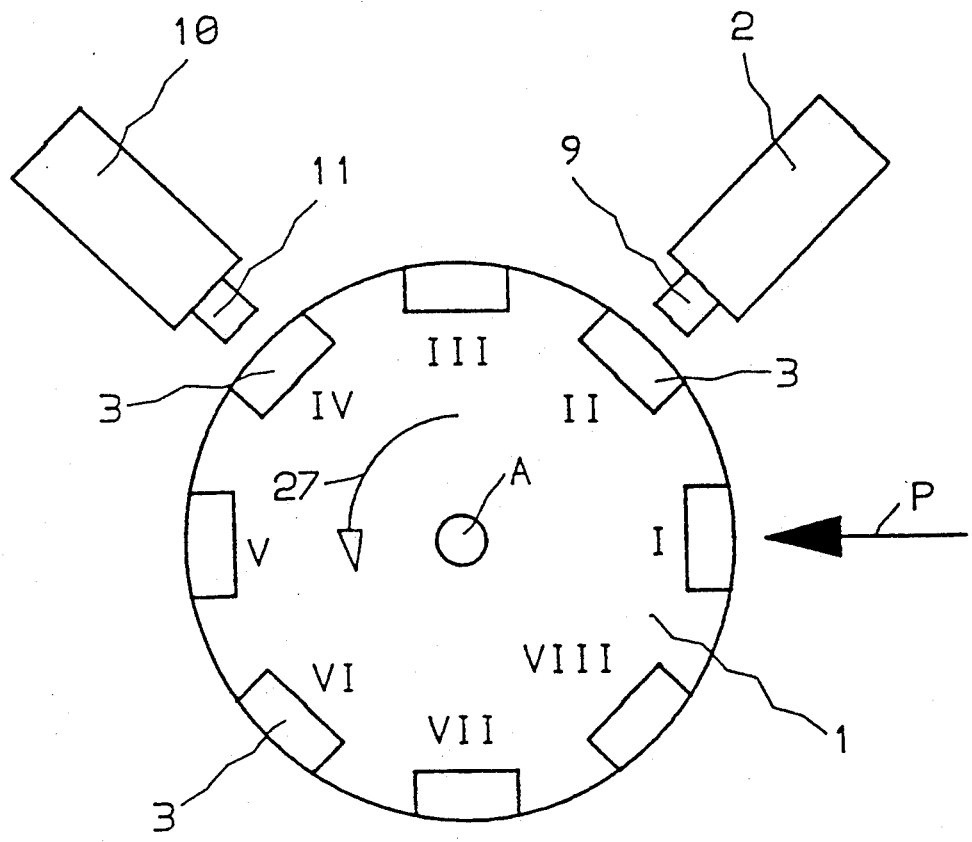
FIGS. 4 and 5 are schematic views of a second embodiment of the invention.

A configuration as shown in FIG. 4 is preferred, if the device according to the invention is to be used in conjunction with a so-called automatic production device, with which the plug pins 5 and 6 are automatically attached to wire 7, by going through several operating stations.

In the injection molding unit according to FIG. 4, eight injection dies 3 are attached to carrier 1. In addition, a second extruder 10 with an injection head 11 is provided. Such an injection molding unit can easily be adapted to an automatic manufacturing cycle. In accordance with this cycle, the carrier 1 rotates in steps, which correspond to the distance of the injection dies 3 from each other. In this instance, the rotation is at a 45° angle.

The device of FIG. 4 operates in the following manner. A wire 7, equipped with plug pins 5 and 6, is placed in the open injection die 3 at loading position I (arrow P). This injection die reaches position II with the next rotation of carrier 1. Extruder 2 is located in this position and at first remains passive during the startup of the device described here. The injection die 3 is closed by the movement from loading position I to position II. Another wire 7 is placed in the injection die 3 in loading position I. Such loading takes place each time after carrier 1 has rotated.

During the next step of carrier 1, the injection die 3 with the first inserted wire 7 reaches position III, while injection die 3 with the second wire 7 stays in position II. Extruder 2 becomes active in this step, so that the injection die 3 is filled as described earlier for FIG. 1. During the next step of the carrier 1, the injection die 3 with the first wire 7 is filled by extruder 10 in position IV. Extruder 2 is again passive in this step.

In the operation of the device, only one of the two extruders 2 or 10 is alternatively active during each step of carrier 1. In each instance, they advance towards carrier 1 for the injection process, so that their injection heads 9 or 11 are located at the inlet openings 8 of injection dies 3. Extruders 2 and 10 may be prepared for the next injection procedure during their inactive period. Thus, the device can also be used for relatively short cycle periods.

The injection die 3, filled by extruder 2, passes in steps through positions III, IV, V and VI. The extruded material of protective cover 4 cools sufficiently during this time. Additional cooling could be provided, if necessary, with water. The finished wire 7 may be removed from the open injection die 3 in position VII. After position VIII, the die 3 returns open to position I. The finished wire 7 could also be removed prior to position VII, or in position VIII. It must only be ensured that the material of protective cover 4 has already hardened sufficiently in the injection die 3. The injection die 3, which is filled in position IV, passes through the subsequent positions in a way similar to the described movement of the injection die 3 from position II.

The device according to the invention has a rotating carrier 1 with at least three injection dies 3 and an extruder 2, as seen in FIG. 1. More than three injection dies and more than one extruder may be used. The quantity is determined by the technical requirements of each instance. A particularly advantageous device has eight injection dies 3 and two alternately operating extruders 2 and 10, as shown in FIG. 4.

Figure 5:
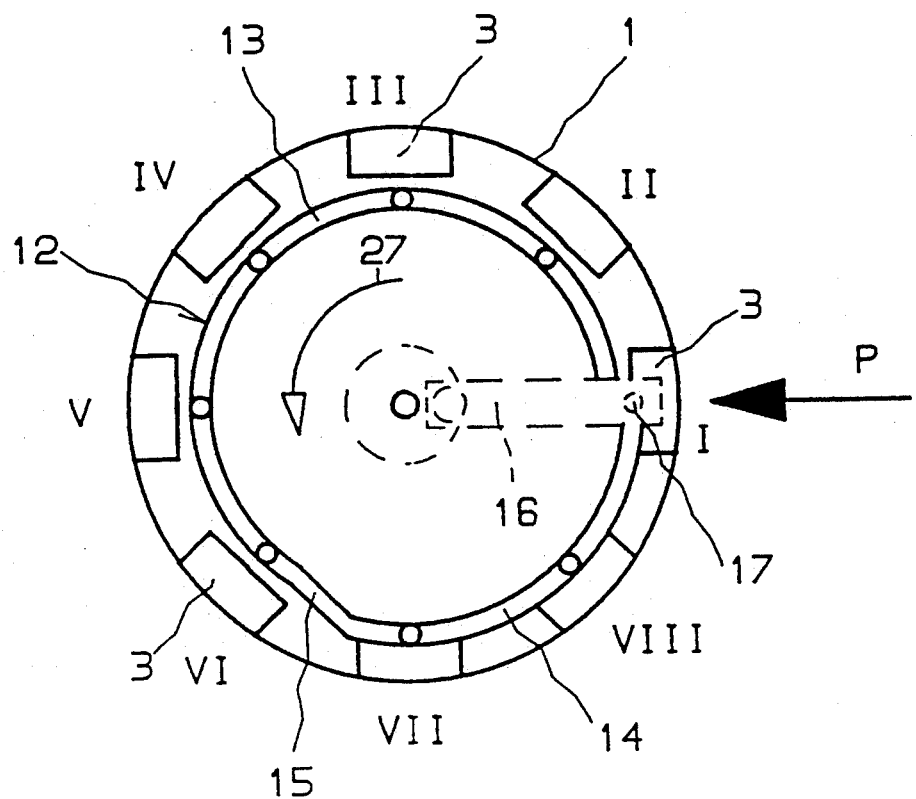

During the rotation of carrier 1, the injection dies 3 are guided through a fixed guide path 12, as shown in FIG. 5. The guide path 12 is located in a fixed part of the device in the immediate vicinity of carrier 1. The guide path 12 is defined by two parts or portions 13 and 14, which are concentric with the axis A of carrier 1. Part 14 has a larger radius than part 13. Parts 13 and 14 together extend for nearly 360°. At one end, the two parts 13 and 14 are connected by a transition piece 15 of guide path 12. At the other end, parts 13 and 14 are located at the loading position I or P1.

A lever 16, which can move lengthwise, is shown by broken lines in FIG. 5. It is attached to fixed parts of the device at the loading position I. A more detailed configuration of the lever 16 can be seen in FIG. 6. It operates radially in relation to carrier 1. Lever 16 serves to pull the guide element 17 of the injection die 3 located in the loading position I, from part 14 of guide path 12 to the level of the part 13, which has a smaller radius.

Figure 6:
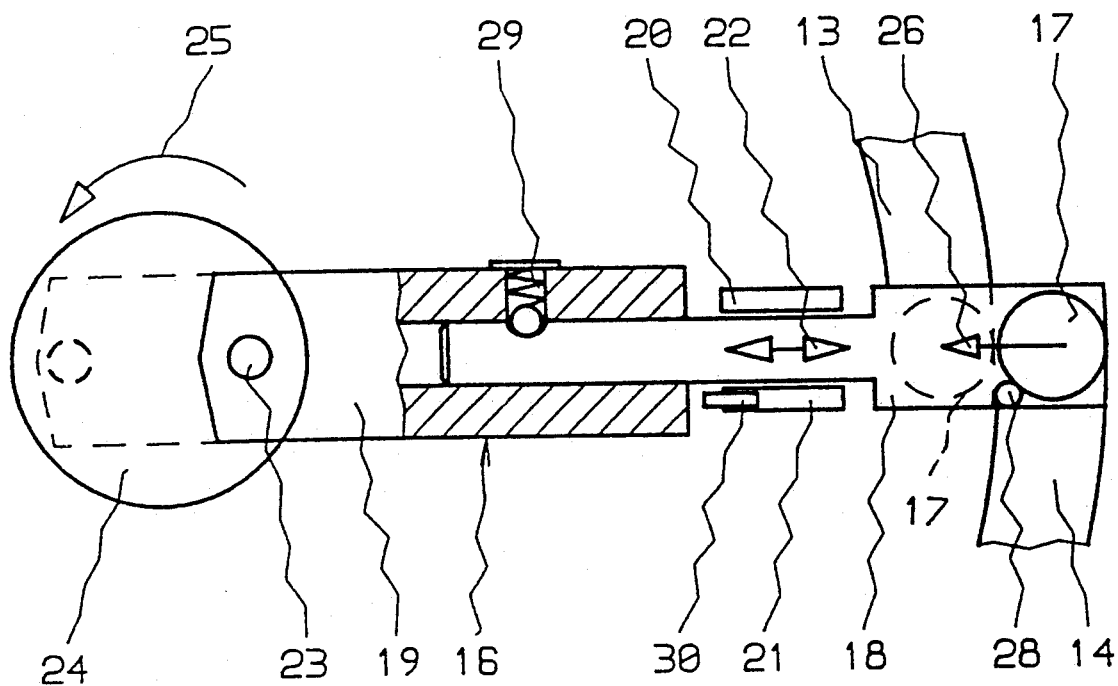
FIG. 6 is a schematic view showing the lever operating mechanism of the present invention with the lever in its open position (solid line) and its closed position (dotted line).

Referring to FIGS. 5 and 6, the function of the lever 16 can be explained as follows. The guide elements 17 located on the injection dies 3 can be ball bearings. They fit into the guide path 12 and their movement is controlled by it when the carrier 1 rotates. The guide elements 17 are represented by a circle in FIG. 5 and 6. Their relationship to injection dies 3 can be seen in FIGS. 7 and 8.

Lever 16 includes two parts 18 and 19 moveable with respect to each other by means of an appropriate mechanical connection (not shown). Part 18 is guided between jaws 20 and 21, so that it moves in a straight line in the direction of double arrow 22. Part 19 of lever 16 is located eccentrically at turning point 23, in the front part of a spindle 24, which is situated on the fixed part along the axis A of carrier 1. Spindle 24 is rotated by an electric motor, for example, which preferably is the same motor used to rotate carrier 1. When spindle 24 rotates 180°, turning point 23 moves in the direction of arrow 25, to the position indicated by broken lines in FIG. 6.

The lever 16 is initially in its extended position when the guide element 17 is rotated into the solid line position shown in FIG. 6. When a wire 7 with contact elements 5 and 6 has been placed in the open injection die 3 in loading position I (arrow P), the spindle 24 rotates 180° moving the lever 16, in the direction of arrow 26, to the position indicated by broken lines in FIG. 6. This movement of the lever 16 causes guide element 17 of injection die 3 in the loading position I to be pulled by the lever 16 from the position of part 14 of guide path 12, to its part 13 area. Carrier 1 rotates one step in the direction of arrow 27, as soon as guide element 17 has reached the position indicated by broken lines in FIG. 6. This causes the corresponding injection die 3 to reach position II. The described movement of lever 16 also closes the injection die 3 in position I, so that it can be filled by extruder 2 or 10, respectively installed in position II or IV.

Figure 7:
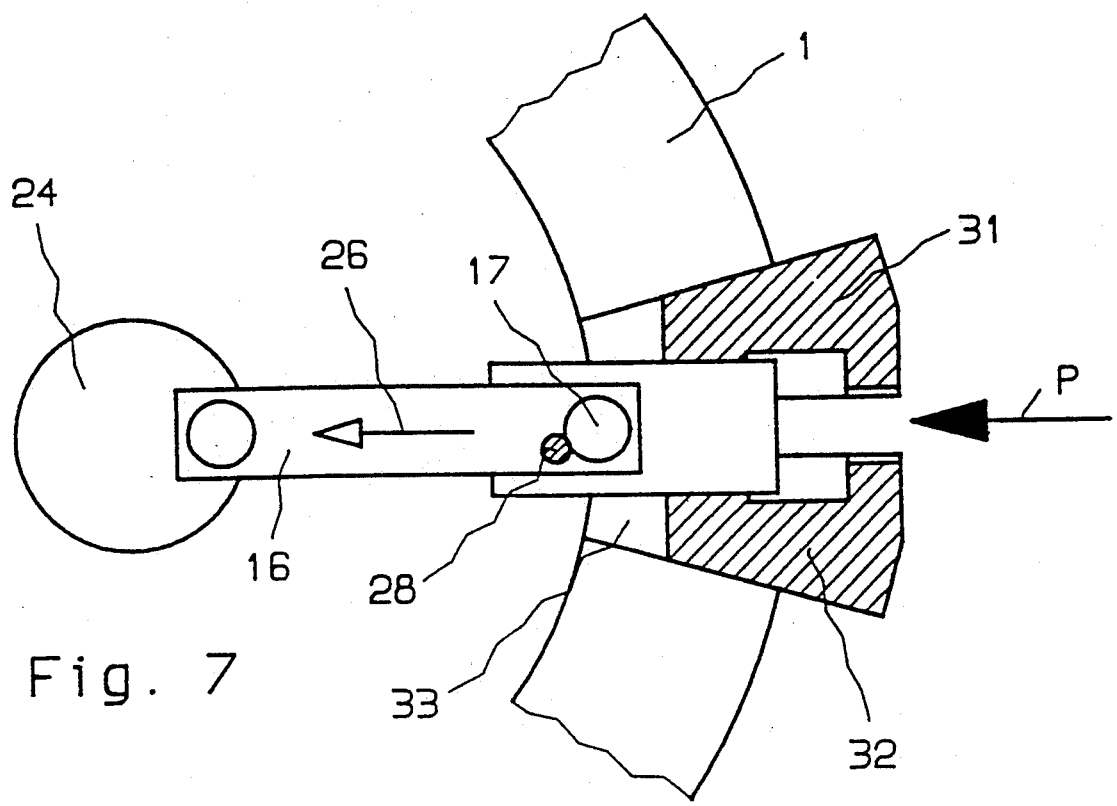
FIGS. 7 and 8 are schematic illustrations of one of the injection dies, including the lever operating mechanism, shown in its open and closed positions, respectively.

A moveable indexing pin 28, shown in FIGS. 6 and 7, may be installed in part 18 of lever 16, to ensure the exact placement of injection die 3 in loading position I. For the loading process, it is placed in a position where it contacts guide element 17 capturing the guide element 17 in cooperation with the end of the lever 16.

During the loading process, the pin 28 and the lever 16 prevents any movement of guide element 17, and thereby of injection die 3, in the direction of arrow 26. The pin 28 is preferably withdrawn before lever 16 moves in the direction of arrow 26. The pin 28 may be activated pneumatically, hydraulically, or even electrically.

In addition, a safety mechanism with a trigger mechanism may be attached to lever 16, to react if wire 7 is not correctly inserted into injection die 3. This prevents injection die 3 from closing and destroying the incorrectly inserted wire 7 or damaging itself. In the event of an incorrectly inserted wire 7, the trigger mechanism would cause the entire device to shut down. The safety mechanism may be a spring 29, for example, which interlocks parts 18 and 19 of lever 16 to each other. This connection is broken if wire 7 is incorrectly inserted, and injection die 3 is unable to close with sufficient ease. For example, a proximity switch 30, acting as the trigger mechanism, would immediately shut down the entire device. Spring 29 may be in the form of a spring package; or two or more springs may also be used.

Each injection die 3 passes stations I through VIII, guided by guide path 12, and then returns to loading position I. The movement of guide element 17 of injection dies 3 is controlled by guide path 12. The injection dies 3 are closed in the part 13 of guide path 12. As shown in FIG. 5, this applies to positions II through VI.

In part 14 of guide path 12, the injection dies 3 are open in positions VII and VIII. To that end, the guide elements 17 are controlled by the transition piece 15 of guide path 12, and open in accordance with the transition piece 15.

Guide path 12 may be U-shaped to steer the guide elements 17 without any further means. However, it would also be possible to use a guide path having only a single edge, against which the guide elements 17 could be pressed by spring force.

Figure 8:
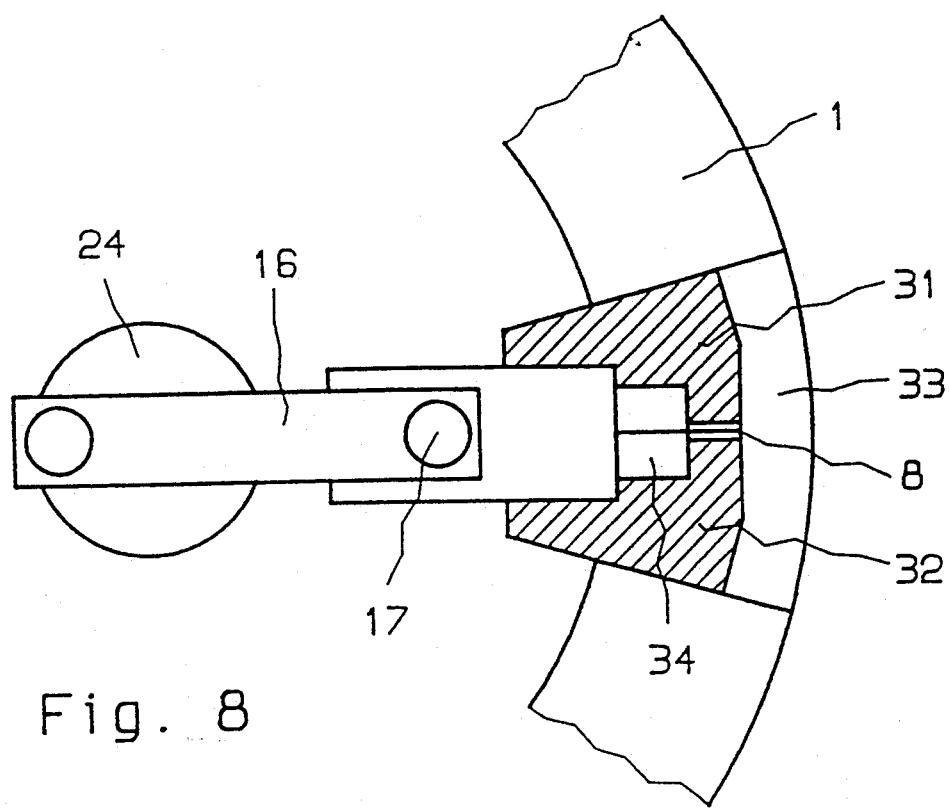

The principle of the injection die 3 configuration can be seen in FIGS. 7 and 8:

An injection die 3 has two parts 31 and 32, which can move inside a V-shaped cutout 33 in carrier 1. They are controlled in cutout 33 by a spring/groove arrangement, for example, or by a dovetail guide. Cutout 33 opens toward the outside. Its larger width therefore faces towards the outside. Both parts 31 and 32 of injection die 3 are connected to guide element 17. As shown in FIG. 7, the injection die 3 is open in the loading position I, so that a wire 7 can be inserted into part 32. As described earlier, lever 16 pulls the guide element 17 in the direction of arrow 26, which closes injection die 3 as shown in FIG. 8. In this position, the cavity 34, into which a wire 7 has been inserted, can be filled with material for the protective cover 4, extruded through the inlet opening 8.

Thus, it can be seen from the foregoing specification and attached drawings that the present invention provides a unique means for attaching a protective cover to the end of an electric wire.

The invention as described above admirably achieves the objects of the invention; however, it will be appreciated that the departures can be made by those skilled in the art without departing from the spirit and scope of the invention, which is limited only by the following claims.

What is claimed is:

1. A device for attaching a protective cover, made of insulative material, to an end of an electric wire with at least one lead, with a contact element installed on said at least one lead, comprising:
   an injection molding unit, with which the protective cover is extruded around the contact element and the end of the wire, the injection molding unit including:
      a carrier rotatable around an axis,
      at least one injection molding device located adjacent the carrier,
      at least three injection dies attached to said carrier, each injection die being spaced an equal distance from each adjacent injection die in circumferential direction, and said at least three injection dies being spaced at equal distances from the axis of the carrier, the injection dies moveable between open and closed positions,
   a fixed part adjacent the carrier defining a guide path extending in the circumferential direction, the guide path having first and second portions at different radii that are concentric with the axis of the carrier, the first and second portions extending together nearly 360° and converging and being connected at one end through a transition piece in the guide path, while the other ends are located at a loading position of the injection dies, and
   guide elements attached to the injection dies and having means for following the guide path, whereby the injection dies are in the closed position as they pass through the first portion of the guide path and are in the open position as they pass through the second portion of the guide path.

2. A device according to claim 1, wherein a lever is attached to the fixed part adjacent the carrier at the loading position of the injection dies, the lever moveable in a radial direction of the carrier to move said injection dies between the open and closed positions.

3. A device according to claim 2, wherein the lever is attached eccentrically to a spindle located along the axis of the carrier for moving the lever in the radial direction.

4. A device according to claim 3, further comprising an electric motor for activating both the carrier and the spindle.

5. A device according to claim 2, wherein the lever has means for moving in the radial direction over a path corresponding to the difference in the radii of the first and second portions of the guide path.

6. A device according to claim 2, wherein an end of the lever has means to engage the injection die in the loading position thereof.

7. A device according to claim 2, wherein a moveable pin is positioned in the lever to initially fix each of the injection dies in the open position when in the loading position.

8. A device according to claim 2, wherein a safety mechanism is attached to the lever to detect malfunction of the device.

9. A device according to claim 1, wherein each of the injection dies has two parts attached to its guide element for moving in a cutout in the carrier between the open and closed positions.

10. A device according to claim 1, wherein said at least one injection molding device is two alternately operating injection molding devices located in the circumferential area of the carrier, at a distance from each other, which corresponds to the distance of the two injection dies from each other in the circumferential direction.

11. A device according to claim 1, wherein the carrier is rotatable in steps of an angle that corresponds to the distance of the injection dies from each other.

12. A device according to claim 1, further comprising an electric motor for rotating the carrier.

13. A device according to claim 12, wherein the electric motor is an electric step motor.

14. A device according to claim 1, further including a lever to engage the guide element of the injection die in the loading position and move the guide element in a radial direction thereby moving the engaged injection die between the open and closed positions.

* * * * *